(12) United States Patent
Blondel et al.

(10) Patent No.: US 11,377,536 B2
(45) Date of Patent: Jul. 5, 2022

(54) TRANSFORMATION-STABLE COMPOSITION COMPRISING VISCOUS POLYAMIDE, PRODUCTION THEREOF AND USE OF SAME

(71) Applicant: ARKEMA FRANCE, Colombes (FR)

(72) Inventors: Philippe Blondel, Bernay (FR); Fabrice Glasson, Beaumontel (FR); François Fernagut, Menneval (FR); Jean-Jacques Flat, Goupillieres (FR); Patrick Dang, Saint-leger-de-rotes (FR)

(73) Assignee: ARKEMA FRANCE, Colombes (FR)

( * ) Notice: Subject to any disclaimer, the term of this patent is extended or adjusted under 35 U.S.C. 154(b) by 756 days.

(21) Appl. No.: 15/522,805

(22) PCT Filed: Nov. 5, 2015

(86) PCT No.: PCT/FR2015/052987
§ 371 (c)(1),
(2) Date: Apr. 28, 2017

(87) PCT Pub. No.: WO2016/071638
PCT Pub. Date: May 12, 2016

(65) Prior Publication Data
US 2017/0313843 A1    Nov. 2, 2017

(30) Foreign Application Priority Data
Nov. 5, 2014   (FR) ...................................... 1460666

(51) Int. Cl.
C08K 3/014    (2018.01)
C08L 77/02    (2006.01)
(Continued)

(52) U.S. Cl.
CPC .............. *C08K 3/014* (2018.01); *B32B 27/08* (2013.01); *B32B 27/18* (2013.01); *B32B 27/22* (2013.01);
(Continued)

(58) Field of Classification Search
CPC ........ C08G 69/48; C08G 69/20; C08G 73/10; C08G 79/08; C08K 3/16; C08K 5/29;
(Continued)

(56) References Cited

U.S. PATENT DOCUMENTS 2,705,227 A      3/1955   Stamatoff
4,970,045 A  *  11/1990   Steinberg ................ B29C 41/04
                                                               264/310
(Continued)

FOREIGN PATENT DOCUMENTS

EP          0 471 566           2/1992
KR        10-0558024 B1         3/2006
(Continued)

OTHER PUBLICATIONS

International Search Report (PCT/ISA/210) dated Feb. 4, 2016, by the European Patent Office as the International Searching Authority for International Application No. PCT/FR2015/052987.
(Continued)

*Primary Examiner* — James C Yager
(74) *Attorney, Agent, or Firm* — Buchanan Ingersoll & Rooney P.C.

(57) ABSTRACT

The invention relates to the use of at least one catalyst, at least one copper heat stabiliser and at least one oligo- or poly-carbodiimide with a matrix including at least one polyamide, in order to form a composition that has a good melt viscosity and is stable during transformation, in particular during extrusion.

8 Claims, 1 Drawing Sheet

(51) Int. Cl.

| | |
|---|---|
| C08K 3/16 | (2006.01) |
| C08K 5/29 | (2006.01) |
| F16L 11/04 | (2006.01) |
| C08K 3/32 | (2006.01) |
| B32B 27/34 | (2006.01) |
| B32B 27/32 | (2006.01) |
| B32B 27/08 | (2006.01) |
| B32B 27/18 | (2006.01) |
| C08L 77/06 | (2006.01) |
| B32B 27/22 | (2006.01) |
| F16L 11/06 | (2006.01) |
| C08L 79/00 | (2006.01) |
| C08K 5/435 | (2006.01) |
| F16L 58/00 | (2006.01) |
| B32B 1/08 | (2006.01) |

(52) U.S. Cl.
CPC ............ *B32B 27/32* (2013.01); *B32B 27/34* (2013.01); *C08K 3/16* (2013.01); *C08K 3/32* (2013.01); *C08K 5/29* (2013.01); *C08K 5/435* (2013.01); *C08L 77/02* (2013.01); *C08L 77/06* (2013.01); *C08L 79/00* (2013.01); *F16L 11/04* (2013.01); *F16L 11/06* (2013.01); *F16L 58/00* (2013.01); *B32B 1/08* (2013.01); *B32B 2270/00* (2013.01); *B32B 2307/306* (2013.01); *B32B 2307/546* (2013.01); *B32B 2307/714* (2013.01); *B32B 2597/00* (2013.01)

(58) Field of Classification Search
CPC .......... C08K 3/014; C08K 3/32; C08K 5/435; F16L 58/00; F16L 11/04; F16L 11/06; C08L 77/02; C08L 77/06; C08L 79/00; B32B 27/08; B32B 27/18; B32B 27/22; B32B 27/32; B32B 27/34; B32B 1/08; B32B 2270/00; B32B 2307/306; B32B 2307/546; B32B 2307/714; B32B 2597/00; B29C 48/09
USPC .................................. 428/402, 34.1; 528/323
See application file for complete search history.

(56) References Cited

U.S. PATENT DOCUMENTS

| | | | | |
|---|---|---|---|---|
| 5,360,888 | A * | 11/1994 | Ullrich ................. | C08L 77/00 524/195 |
| 6,451,890 | B1 * | 9/2002 | Imashiro ................. | C08K 3/16 524/195 |
| 2003/0220449 | A1 | 11/2003 | Jacques et al. | |
| 2006/0074158 | A1 | 4/2006 | Blondel et al. | |
| 2008/0274355 | A1 * | 11/2008 | Hewel ................. | C08G 69/265 428/402 |
| 2008/0314471 | A1 | 12/2008 | Bulmer | |
| 2009/0308478 | A1 | 12/2009 | Vo | |
| 2010/0183837 | A1 | 7/2010 | Hochstetter et al. | |
| 2013/0171388 | A1 | 7/2013 | Pawlik et al. | |
| 2015/0322206 | A1 * | 11/2015 | Matsumoto ............. | C08K 7/06 525/423 |

FOREIGN PATENT DOCUMENTS

| | | |
|---|---|---|
| WO | WO 2008/122743 A2 | 10/2008 |
| WO | WO 2013/128097 A1 | 9/2013 |

OTHER PUBLICATIONS

Written Opinion (PCT/ISA/237) dated Feb. 4, 2016, by the European Patent Office as the International Searching Authority for International Application No. PCT/FR2015/052987.
Casey, Jeremiah P., "Cycloaliphatic Amines", Encyclopaedia of Chemical Technology, Kirk-Othmer, 4th Edition, 1992 (month unknown), vol. 2, pp. 386-405.
Campbell, Tod W. et al., "Carbodiimides. IV. High Polymers Containing the Carbodiimide Repeat Unit", J. Org. Chem., 28, pp. 2069-2075, Aug. 1963.
Campbell, Tod W. et al., "Carbodiimides. I. Conversion of Isocyanates to Carbodiimides with Phospholine Oxide Catalyst", J. Am. Chem. Soc., 84, pp. 3673-3677, Oct. 5, 1962.
Wagner, Von Kuno et al., "α, ω-Diisocyanato-carbodiimide und-polycarbodiimide sowie ihre Derivate", Ange. Chem., 93, pp. 855-866, 1981 (month unknown).
Williams, Andrew et al., "Carbodiimide Chemistry: Recent Advances", Chem. Rev., 81, pp. 589-636, 1981 (month unknown).
Office Action (Notification of Reason for Refusal) dated May 27, 2021, by the Korean Patent Office in corresponding Korean Patent Application No. 10-2017-7014611, and an English Translation of the Office Action. (14 pages).

* cited by examiner

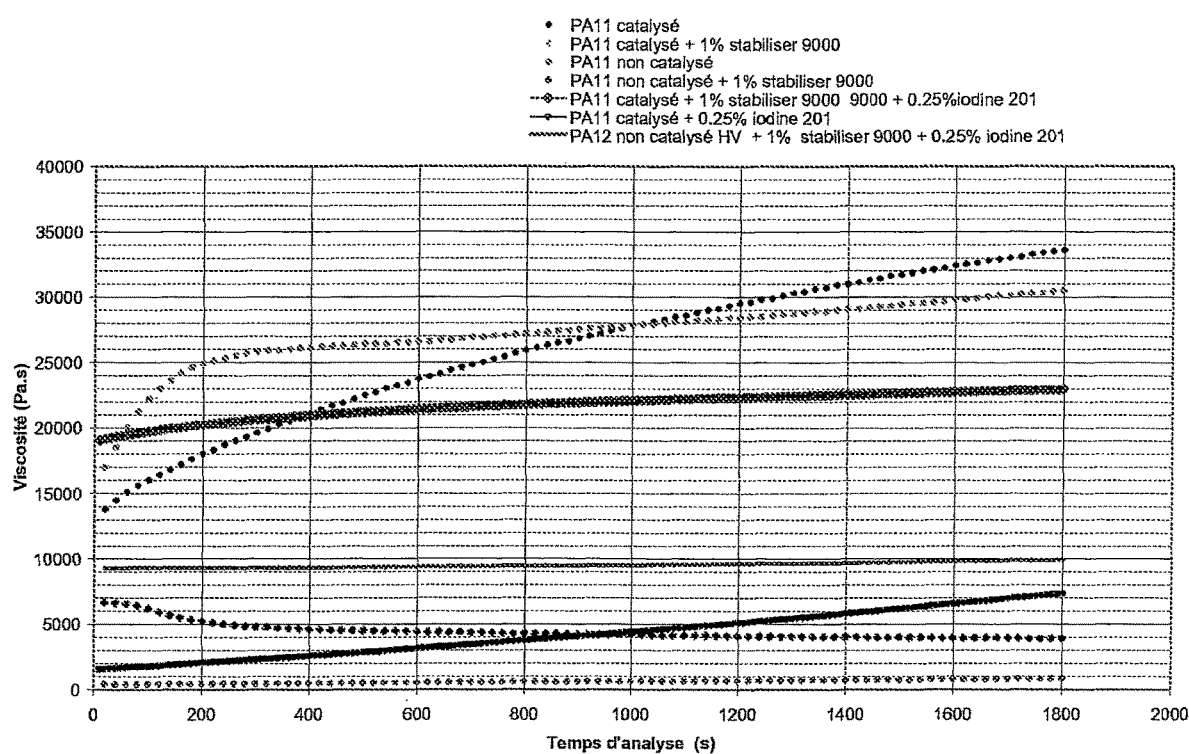

TRANSFORMATION-STABLE COMPOSITION COMPRISING VISCOUS POLYAMIDE, PRODUCTION THEREOF AND USE OF SAME

The present invention relates to the use of at least one catalyst, of at least one copper-based heat stabilizer and of at least one oligo- or polycarbodiimide with a matrix comprising at least one thermoplastic polymer, in particular a polyamide, in order to form a viscous composition which is stable in transformation, in particular in extrusion.

The present invention also relates to the viscous and stable composition as defined above.

The invention also relates to the use of the above composition for forming a structure, such as:
a flexible pipe intended for the transportation of gas, for the exploitation of offshore oil deposits,
a flexible pipe for motor vehicles, in particular for the transportation of fuel (gasoline, diesel, biodiesel or ethanol), for refrigeration, for air conditioning, for ducts produced in particular by extrusion-blow molding for supplying with air, a hollow body, a molding or a sports item.

The invention also relates to the structures obtained from said compositions.

The exploitation of offshore oil deposits subjects the materials employed to extreme conditions, in particular the pipes connecting the various offshore devices of the platform and conveying the hydrocarbons extracted, which are generally transported at high temperature and high pressure (for example, 700 bar).

During the operation of the plants, acute problems of mechanical strength, of thermal resistance and of chemical resistance of the materials employed are thus posed. Such pipes must in particular withstand oil which is hot, gas, water and mixtures of at least two of these products for periods of time which can reach 20 years.

Conventionally, these pipes comprise a nonleaktight internal metal layer formed by a helically wound profiled metal strip, such as an interlocked metal strip. This internal metal layer, which gives shape to the pipe, is coated, generally by extrusion, with a polymer layer intended to confer leaktightness. Other protective and/or reinforcing layers, such as plies of metal fibers, thermoplastics and rubbers, can also be positioned around the leaktight polymer layer.

For working temperatures below 40° C., the polymer is crosslinked or noncrosslinked HDPE (high density polyethylene). For temperatures above 40° C., polyamide is used and, for temperatures above 90° C., PVDF (polyvinylidene fluoride) is employed.

In view of the high cost of PVDF, and despite the implication of higher temperatures than those recommended, the choice of the polymer has fallen on polyamides, such as PA11 and PA12, well known for their good thermal behavior, their chemical resistance, in particular toward solvents, their resistance to bad weather and to radiation, their impermeability to gases and liquids, and their nature as electrical insulators.

These polyamides are already commonly used in the manufacture of pipes intended to convey hydrocarbons extracted from offshore or onshore oil deposits but exhibit, however, the disadvantage of aging excessively rapidly.

In order to overcome this disadvantage and thus to improve the resistance to aging of these polyamide-based pipes, the document US 2003/0220449, on behalf of the applicant company, provides a composition comprising a mixture of PA, of plasticizer and of an elastomer chosen from nitrile/butadiene rubber (NBR) and hydrogenated nitrile/butadiene rubber (H-NBR).

The use of an elastomer of the NBR or H-NBR type in the compositions described in the document US 2003/0220449 exhibits several advantages in comparison with the prior compositions solely based on polyamide and plasticizer.

In particular, the introduction of one or other of these elastomers makes it possible to significantly increase the resistance to aging of the flexible pipes comprising such a layer, especially by limiting the content by weight of plasticizer.

However, H-NBR (or hydrogenated NBR) elastomers are expensive and necessitate, like their nonhydrogenated NBR homologs, furthermore carrying out a preliminary stage of grinding, adding a further additional cost to that already generated by the NBR or H-NBR starting material.

In order to overcome the above disadvantages, the applicant company describes, in the document WO 08/122743, the use of a composition comprising at least one semicrystalline polyamide, a functionalized polyolefin and a plasticizer for the manufacture of flexible pipes used in particular for the exploitation of oil or gas deposits.

Furthermore, the extrusion of large-diameter pipes for these applications requires compositions exhibiting high melt viscosities but also a stability in transformation (the residence time of the product during its extrusion is at least 5 min or 300 seconds), and also resistance to thermal oxidation.

In order to obtain viscosities of this type, phosphoric catalysis makes it possible, under certain conditions (degree of catalysis, vacuum, humidity), to succeed in doing this but the product may continue to change during the transformation. Furthermore, this postreactivity is sensitive to the residual humidity of the granules.

In order to overcome this, the application US 2013/0171388 describes PA materials with chain extenders (Brug-golen® and/or Stabaxol®). Nevertheless, these compositions also have high polydispersity indices and thus a large number of branchings, the consequence of which is to produce high viscosities in solution.

Thus, the viscosity in solution is not representative of the melt viscosity due to the potential branchings in the polyamide.

Furthermore, the current polyamide compositions generally make possible only a working temperature of the pipes of 60° C. to 70° C., depending on the pH or on the total acid number (TAN) of the fluid transported and on the acceptance criterion used.

It is thus necessary to find a compromise between these different parameters and furthermore to increase the working temperature of the pipes.

A first subject matter of the invention is thus the use of at least one catalyst, of at least one copper-based heat stabilizer and of at least one oligo- or polycarbodiimide with a matrix comprising at least one thermoplastic polymer, in particular a polyamide, in order to form a viscous composition which is stable in transformation, especially in extrusion.

A second subject matter of the invention is the provision of a composition defined above and its use in forming a structure, such as:
a flexible pipe intended for the transportation of gas, for the exploitation of offshore oil deposits, a flexible pipe for motor vehicles, in particular for the transportation of fuel (gasoline, diesel, biodiesel or ethanol), for refrigeration, for air conditioning, for ducts produced in particular by extrusion-blow molding for supplying with air, a hollow body, Another subject matter of the invention is the provision of flexible pipes defined above.

USE

The present invention relates to the use of at least one catalyst, of at least one copper-based heat stabilizer and of at least one oligo- or polycarbodiimide with a matrix comprising at least one thermoplastic polymer, in particular a polyamide, in order to form a composition which exhibits a good melt viscosity and which is stable in transformation.

The inventors have found, entirely unexpectedly, that the combination of three components, namely a catalyst, a copper-based heat stabilizer and an oligo- or polycarbodiimide, makes it possible, in combination with a thermoplastic polymer, in particular a polyamide, to obtain compositions which exhibit good viscosities, that is to say melt viscosities which are sufficiently high to be able to be transformed, in particular by extrusion, without, however, increasing the viscosity in solution, in other words the inherent viscosity, said melt viscosity furthermore being sufficiently stable during transformation, in particular for extrusion.

The melt viscosity is determined by oscillatory rheology at 270° C. at 10 rad/sec while flushing with nitrogen with 5% deformation and shearing of 10 sec$^{-1}$ on a Physica MCR301 device between two parallel plates with a diameter of 25 mm.

The inherent viscosity is determined according to the standard ISO 307-2007 but in m-cresol instead of sulfuric acid, the temperature being 20° C.

The expression "stable in transformation" means that the melt viscosity does not change by more than 70% as a function of the time, and specifically between 1 minute (time necessary to melt the product) and at least 30 minutes, in particular between 1 minute and 30 minutes.

Advantageously, the melt viscosity of said composition is substantially constant between 1 minute and at least 5 minutes, especially between 1 minute and 5 minutes.

"Substantially constant" should be understood as meaning that the melt viscosity does not change in a proportion of more than 20% between 1 minute and at least 5 minutes, in particular between 1 minute and 5 minutes.

The time of 5 minutes represents the residence time of the substance, in particular in the extruder during the processing.

Advantageously, said composition additionally exhibits a resistance to thermal oxidation.

The expression "resistance to thermal oxidation" is characterized by the half life (in hours) of the materials. It corresponds to the time at the end of which the ISO 527-2 1 BA test specimens, aged in air at 140° C., have lost half of their initial elongation at break, measured according to the standard ISO 527-2 (2012).

Advantageously, the resistance to thermal oxidation is at least 80 days, in particular 100 days.

Advantageously, said composition exhibits a melt viscosity of approximately 13 000 to approximately 23 000 Pa·s, as determined by oscillatory rheology at 270° C. as defined above.

The inventors have thus found, entirely unexpectedly, that the key factor for the transformation of the composition of the invention is its rheology and not the inherent viscosity. This is because, at constant inherent viscosity, it is noticed that only the compositions comprising the catalyst/copper-based heat stabilizer system and the oligo- or polycarbodiimide make it possible to obtain a composition exhibiting an appropriate rheology, that is to say a melt viscosity comprised of approximately 13 000 to approximately 23 000 Pa·s, said viscosity also being substantially constant and stable in transformation as defined above.

The Catalyst:

The term "catalyst" denotes a polycondensation catalyst, such as an inorganic or organic acid.

Advantageously, the proportion by weight of catalyst is comprised of approximately 50 ppm to approximately 5000 ppm, especially of approximately 100 to approximately 3000 ppm, with respect to the total weight of the composition.

Advantageously, the catalyst is chosen from phosphoric acid ($H_3PO_4$), phosphorous acid ($H_3PO_3$), hypophosphorous acid ($H_3PO_2$) or a mixture of these.

Advantageously, the present invention thus relates to the use defined above of at least one catalyst, in a proportion by weight of catalyst comprised of approximately 50 ppm to approximately 5000 ppm, in particular of approximately 100 to approximately 3000 ppm, with respect to the total weight of the composition, of at least one copper-based heat stabilizer and of at least one oligo- or polycarbodiimide, with a matrix comprising at least one thermoplastic polymer, in particular a polyamide, said catalyst being chosen from phosphoric acid ($H_3PO_4$), phosphorous acid ($H_3PO_3$), hypophosphorous acid ($H_3PO_2$) or a mixture of these.

Advantageously, the catalyst is chosen from phosphoric acid ($H_3PO_4$), phosphorous acid ($H_3PO_3$) in a proportion comprised of approximately 100 to approximately 3000 ppm.

The Copper-Based Stabilizer:

A well-known example is the mixture of CuI and KI, where the CuI:KI ratio is typically between 1:2 and 1:15. An example of such a stabilizer is PolyAdd P201 from Polyad Services.

Fuller details with regard to copper-based stabilizers will be found in the U.S. Pat. No. 2,705,227.

Advantageously, the copper-based stabilizer is chosen from copper halides, copper acetate, copper halides or copper acetate as a mixture with at least one alkali metal halide, and their mixtures, preferably mixtures of copper iodide and potassium iodide (CuI/KI).

The copper-based stabilizer can also be a Bruggolen® H3386.

Advantageously, the copper-based heat stabilizer used to form the composition defined above is in a proportion of approximately 0.05% to approximately 1%, especially of approximately 0.05% to approximately 0.3%, by weight, with respect to the total weight of the composition.

Preferably, the copper-based heat stabilizer is a mixture of potassium iodide and copper iodide (KI/CuI).

Preferably, the mixture of potassium iodide and copper iodide of use according to the present invention is found in a ratio of 90/10 to 70/30.

Advantageously, the present invention thus relates to the use defined above of at least one catalyst, of at least one copper-based heat stabilizer in a proportion of approximately 0.05% to approximately 1%, in particular of approximately 0.05% to approximately 0.3%, by weight, with respect to the total weight of the composition, and of at least one oligo- or polycarbodiimide, with a matrix comprising at least one thermoplastic polymer, in particular a polyamide, said copper-based heat stabilizer being a mixture of potassium iodide and copper iodide (KI/CuI), preferably in a ratio of 90/10 to 70/30.

Advantageously, the present invention relates to the use defined above of at least one catalyst, in a proportion by weight of catalyst comprised of approximately 50 ppm to approximately 5000 ppm, in particular of approximately 100 to approximately 3000 ppm, with respect to the total weight of the composition, of at least one copper-based heat stabilizer in a proportion of approximately 0.05% to approximately 1%, in particular of approximately 0.05% to approximately 0.3%, by weight, with respect to the total weight of the composition, and of at least one oligo- or polycarbodiimide, with a matrix comprising at least one thermoplastic polymer, in particular a polyamide, said catalyst being chosen from phosphoric acid ($H_3PO_4$), phosphorous acid ($H_3PO_3$), hypophosphorous acid ($H_3PO_2$) or a mixture of these, and said copper-based heat stabilizer being a mixture of potassium iodide and copper iodide (KI/CuI), preferably in a ratio of 90/10 to 70/30.

Advantageously, the catalyst is chosen from phosphoric acid ($H_3PO_4$), phosphorous acid ($H_3PO_3$) in a proportion comprised of approximately 100 to approximately 3000 ppm.

The Carbodiimide:

The carbodiimide represents a conventionally known carbodiimide oligomer and polymer and can be prepared by polymerization of diisocyanates. This reaction can be accelerated by catalysts and products with elimination of carbon dioxide (J. Org. Chem., 28, 2069 (1963); J. Am. Chem. Soc. 84, 3673 (1962); Chem. Rev., 81, 589 (1981); Ange. Chem., 93, 855 (1981)). The reactants of the NCO end groups can comprise a reactive compound CH, NH or OH, for example malonic acid esters, caprolactam, alcohols or phenols.

In an alternative form, mixtures of mono- and diisocyanates can be polymerized in order to obtain oligo- or polycarbodiimides containing essentially unreactive end groups.

The carbodiimide used is an oligo- or polycarbodiimide of general formula:

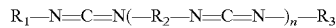

$$R_1-N=C=N(-R_2-N=C=N-)_n-R_3$$

in which $R_1$ and $R_3$ represent $C_1$ to $C_{20}$ alkyls, $C_5$ to $C_{20}$ cycloalkyls, aryls having from 6 to 20 carbon atoms or aralkyls having from 7 to 20 carbon atoms, each optionally being substituted by an isocyanate group optionally comprising a CH, an NH or a reactive compound OH;

$R_2$ represents an alkylene group having from 2 to 20 carbon atoms, a cycloalkylene group having from 5 to 20 carbon atoms, an arylene group having from 6 to 20 carbon atoms or an aralkylene group having from 7 to 20 carbon atoms;

n=1 to 100, preferably from 2 to 80 and preferably from 3 to 70. The oligo- or polycarbodiimide can be a homopolymer or a copolymer, for example a copolymer of 2,4-diisocyanato-1,3,5-triisopropylbenzene and 1,3-diisocyanato-3,4-diisopropylbenzene.

The oligo- or polycarbodiimide can also be chosen from those described in U.S. Pat. No. 5,360,888.

The oligo- or polycarbodiimide can also be cyclic, in particular TCC (Teijin cyclic carbodiimide, sold by Teijin).

The appropriate oligo- and polycarbodiimides can be obtained from commercially available sources, such as Rhein Chemie, Raschig, Ziko or Teijin.

Advantageously, the proportion by weight of oligo- or polycarbodiimide used is comprised of approximately 0.1 to approximately 3%, especially of 0.5 to 2%, in particular approximately equal to 1%, with respect to the total weight of the composition.

Advantageously, the oligo- or polycarbodiimide is chosen from a Stabilizer, especially Stabilizer® 9000, a Stabaxol®, in particular a Stabaxol® P, especially Stabaxol® P100 or Stabaxol® P400, or a mixture of these.

Advantageously, the present invention thus relates to the use defined above of at least one catalyst, of at least one copper-based heat stabilizer and of at least one oligo- or polycarbodiimide in a proportion of approximately 0.1 to approximately 3%, especially of 0.5 to 2%, in particular approximately equal to 1%, by weight, with respect to the total weight of the composition, with a matrix comprising at least one thermoplastic polymer, in particular a polyamide, said oligo- or polycarbodiimide being chosen from a Stabilizer, especially Stabilizer® 9000, a Stabaxol®, in particular a Stabaxol® P, especially Stabaxol® P100 or Stabaxol® P400, or a mixture of these.

Advantageously, the present invention relates to the use defined above of at least one catalyst, in a proportion by weight of catalyst comprised of approximately 50 ppm to approximately 5000 ppm, especially of approximately 100 to approximately 3000 ppm, with respect to the total weight of the composition, of at least one copper-based heat stabilizer and of at least one oligo- or polycarbodiimide in a proportion of approximately 0.1 to approximately 3%, especially of 0.5 to 2%, in particular approximately equal to 1%, by weight, with respect to the total weight of the composition, with a matrix comprising at least one thermoplastic polymer, in particular a polyamide, said catalyst being chosen from phosphoric acid ($H_3PO_4$), phosphorous acid ($H_3PO_3$), hypophosphorous acid ($H_3PO_2$) or a mixture of these, and said oligo- or polycarbodiimide being chosen from a Stabilizer, especially Stabilizer® 9000, a Stabaxol®, in particular a Stabaxol® P, especially Stabaxol® P100 or Stabaxol® P400, or a mixture of these.

Advantageously, the catalyst is chosen from phosphoric acid ($H_3PO_4$), phosphorous acid ($H_3PO_3$) in a proportion comprised of approximately 100 to approximately 3000 ppm.

Advantageously, the present invention relates to the use defined above of at least one catalyst, of at least one copper-based heat stabilizer in a proportion of approximately 0.05% to approximately 1%, especially of approximately 0.05% to approximately 0.3%, by weight, with respect to the total weight of the composition, and of at least one oligo- or polycarbodiimide in a proportion of approximately 0.1 to approximately 3%, especially of 0.5 to 2%, in particular approximately equal to 1%, by weight, with respect to the total weight of the composition, with a matrix comprising at least one thermoplastic polymer, in particular a polyamide, said copper-based heat stabilizer being a mixture of potassium iodide and copper iodide (KI/CuI), preferably in a ratio of 90/10 to 70/30, and said oligo- or polycarbodiimide being chosen from a Stabilizer, especially Stabilizer® 9000, a Stabaxol®, in particular a Stabaxol® P, especially Stabaxol® P100 or Stabaxol® P400, or a mixture of these.

Advantageously, the present invention thus relates to the use defined above of at least one catalyst, in a proportion by weight of catalyst comprised of approximately 50 ppm to approximately 5000 ppm, especially of approximately 100 to approximately 3000 ppm, with respect to the total weight of the composition, of at least one copper-based heat stabilizer in a proportion of approximately 0.05% to approximately 1%, especially of approximately 0.05% to approximately 0.3%, by weight, with respect to the total weight of the composition, and of at least one oligo- or polycarbodiimide in a proportion of approximately 0.1 to approximately 3%, especially of 0.5 to 2%, in particular approximately equal to 1%, by weight, with respect to the total weight of the composition, with a matrix comprising at least one thermoplastic polymer, in particular a polyamide, said catalyst being chosen from phosphoric acid ($H_3PO_4$), phosphorous acid ($H_3PO_3$), hypophosphorous acid ($H_3PO_2$) or a mixture of these, said copper-based heat stabilizer being a mixture of potassium iodide and copper iodide (KI/CuI), preferably in a ratio of 90/10 to 70/30, said oligo- or polycarbodiimide being chosen from a Stabilizer, especially Stabilizer® 9000, a Stabaxol®, in particular a Stabaxol® P, especially Stabaxol® P100 or Stabaxol® P400, or a mixture of these.

Advantageously, the catalyst is chosen from phosphoric acid ($H_3PO_4$), phosphorous acid ($H_3PO_3$) in a proportion comprised of approximately 100 to approximately 3000 ppm.

The Thermoplastic Polymer

As regards the thermoplastic polymer, it can be chosen from polyamides or mixtures of polyamides.

The nomenclature used to define polyamides is described in the standard ISO 1874-1:1992 "Plastics—Polyamide (PA) molding and extrusion materials—Part 1: Designation", in particular on page 3 (tables 1 and 2), and is well known to a person skilled in the art.

The polyamide according to the present invention can have a homopolyamide or copolyamide structure.

Homopolyamide is understood to mean, within the meaning of the present invention, a polyamide which consists only of the repetition of a single unit.

Copolyamide is understood to mean, within the meaning of the present invention, a polyamide which consists of the repetition of at least two units of different chemical structure. This copolyamide can exhibit a random, alternating or block structure.

The polyamide according to the present invention can comprise one or more units with a structure chosen from amino acids, lactams and (diamine).(diacid) units.

When the polyamide comprises an amino acid in its structure, it can be chosen from 9-aminononanoic acid (A=9), 10-aminodecanoic acid (A=10), 10-aminoundecanoic acid (A=11), 12-aminododecanoic acid (A=12) and 11-aminoundecanoic acid (A=11) and its derivatives, in particular N-heptyl-11-aminoundecanoic acid, A denoting the number of carbon atoms in the unit.

When the polyamide comprises a lactam, it may be chosen from pyrrolidinone, 2-piperidinone, caprolactam, enantholactam, caprylolactam, pelargolactam, decanolactam, undecanolactam and lauryllactam (A=12).

When the polyamide comprises is a unit corresponding to the formula (Ca diamine).(Cb diacid), Ca and Cb denoting the number of carbon atoms respectively in the diamine and the diacid, the (Ca diamine) unit is chosen from linear or branched aliphatic diamines, cycloaliphatic diamines and alkylaromatic diamines.

When the diamine is aliphatic and linear, of formula $H_2N-(CH_2)_a-NH_2$, the (Ca diamine) monomer is preferably chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and diamines obtained from fatty acids.

When the diamine is aliphatic and branched, it can comprise one or more methyl or ethyl substituents on the main chain. For example, the (Ca diamine) monomer can advantageously be chosen from 2,2,4-trimethyl-1,6-hexanediamine, 2,4,4-trimethyl-1,6-hexanediamine, 1,3-diaminopentane, 2-methyl-1,5-pentanediamine or 2-methyl-1,8-octanediamine.

When the (Ca diamine) monomer is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), bis(p-aminocyclohexyl)methane (PACM), isopropylidenedi(cyclohexylamine) (PACP), isophoronediamine (a=10), piperazine (a=4) or aminoethylpiperazine. It can also comprise the following carbon backbones: norbornylmethane, cyclohexylmethane, dicyclohexylpropane, di(methylcyclohexyl) or di(methylcyclohexyl)propane. A nonexhaustive list of these cycloaliphatic diamines is given in the publication "Cycloaliphatic Amines" (Encyclopaedia of Chemical Technology, Kirk-Othmer, 4th Edition (1992), pp. 386-405).

When the (Ca diamine) monomer is alkylaromatic, it is chosen from 1,3-xylylenediamine and 1,4-xylylenediamine. The (Cb diacid) unit is chosen from linear or branched aliphatic diacids, cycloaliphatic diacids and aromatic diacids.

When the (Cb diacid) monomer is aliphatic and linear, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecenedioic acid (b=18), eicosanedioic acid (b=20), docosanedioic acid (b=22) and fatty acid dimers containing 36 carbons.

The fatty acid dimers mentioned above are dimerized fatty acids obtained by oligomerization or polymerization of unsaturated monobasic fatty acids bearing a long hydrocarbon chain (such as linoleic acid and oleic acid), as described in particular in the document EP 0 471 566.

When the diacid is cycloaliphatic, it can comprise the following carbon backbones: norbornylmethane, cyclohexylmethane, dicyclohexylmethane, dicyclohexylpropane, di(methylcyclohexyl) or di(methylcyclohexyl)propane.

When the diacid is aromatic, it is chosen from terephthalic acid (denoted T), isophthalic acid (denoted I) and naphthalenic diacids.

Advantageously, the thermoplastic polymer is a polyamide chosen from an aliphatic polyamide, a cycloaliphatic polyamide, an aromatic polyamide or a mixture of these.

Advantageously, the polyamide exhibits a M.p. comprised of 160° C. to 290° C., determined according to the standard ISO 11357-3 (2013).

Advantageously, the proportion of polyamide is comprised of approximately 95.5 to approximately 99.845%.

Preferably, the polyamide of use according to the invention is chosen from PA 6, PA 11, PA 12, PA 6.10, PA 6.6, PA 6.12, PA 10.10, PA 10.12, PA 11/10.T, PA 11/6.T, 12/10.T, 6.10/10.T, 6.12/10.T, 10.10/10.T, 10.12/10.T, 11/6.T/10.T, 12.12/10.T, 12/6.10/10.T, 12/6.12/10.T, 12/10.10/10.T, 12/10.12/10.T and 12/12.12/10.T.

Advantageously, the polyamide is chosen from: PA 11, PA 12, PA 11/10.T, PA 10.10, PA 10.12 and the copolyamides 11/12 having either more than 90% of units 11 or more than 90% of units 12, preferably from PA 11, PA 12, PA 11/10.T, PA 10.10 and PA 10.12.

The Polyolefin

Advantageously, the thermoplastic polymer, in particular the polyamide, can contain at least one polyolefin.

The polyolefin may be functionalized or nonfunctionalized or be a mixture of at least one functionalized and/or at least one nonfunctionalized. To simplify, functionalized polyolefins (B1) and nonfunctionalized polyolefins (B2) have been described later.

The functionalized polyolefin (B1) can be chosen from the following (co)polymers, grafted with maleic anhydride, in which the degree of grafting is, for example, from 0.01% to 5% by weight:
PE, PP, copolymers of ethylene with propylene, butene, hexene or octene containing, for example, from 35% to 80% by weight of ethylene;
ethylene/α-olefin copolymers, such as ethylene/propylene, EPRs (abbreviation of ethylene/propylene rubbers) and ethylene/propylene/dienes (EPDMs),
styrene/ethylene-butene/styrene (SEBS), styrene/butadiene/styrene (SBS), styrene/isoprene/styrene (SIS) or styrene/ethylene-propylene/styrene (SEPS) block copolymers;
copolymers of ethylene and vinyl acetate (EVA), containing up to 40% by weight of vinyl acetate;
copolymers of ethylene and alkyl (meth)acrylate, containing up to 40% by weight of alkyl (meth)acrylate;
copolymers of ethylene and vinyl acetate (EVA) and alkyl (meth)acrylate, containing up to 40% by weight of comonomers;
maleated polyolefins, such as Tafmer® MH5020, Tafmer® 610MP, Tafmer® MD715, Orevac® IM800, Exxelor® VA 1801 and 1803, and Fusabond.
The Tafmer® products are sold by Mitsui Chemicals, the Orevac® products by the applicant company and the Exxelor products by Exxon Mobil Chemicals.

The functionalized polyolefin (B1) can also be a copolymer or terpolymer of at least the following units: (1) ethylene, (2) alkyl (meth)acrylate or saturated carboxylic acid vinyl ester and (3) anhydride, such as maleic anhydride or (meth)acrylic acid anhydride.

Mention may be made, as examples of functionalized polyolefins of the latter type, of the following copolymers, where ethylene preferably represents at least 60% by weight and where the termonomer (the function) represents, for example, from 0.1% to 10% by weight of the copolymer:
ethylene/alkyl (meth)acrylate/maleic anhydride or (meth) acrylic acid copolymers;
ethylene/vinyl acetate/maleic anhydride copolymers;
ethylene/vinyl acetate or alkyl (meth)acrylate/maleic anhydride or (meth)acrylic acid.

The term "alkyl (meth)acrylate" in (B1) or (B2) denotes $C_1$ to $C_{12}$ alkyl methacrylates and acrylates and can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

The abovementioned copolymers, (B1) and (B2), can be copolymerized in random or block fashion and exhibit a linear or branched structure.

The molecular weight, the MFI index and the density of these polyolefins can also vary to a large extent, which will be appreciated by a person skilled in the art. MFI is the abbreviation for Melt Flow Index. It is measured according to the standard ASTM 1238-13.

Advantageously, the nonfunctionalized polyolefins (B2) are chosen from polypropylene homopolymers or copolymers, and any homopolymer of ethylene or copolymer of ethylene and a comonomer of α-olefin type, such as propylene, butene, hexene, octene or 4-methyl-1-pentene. Mention may be made, for example, of PPs, high-density PEs, medium-density PEs, linear low-density PEs, low density PEs or very low density PEs. These polyethylenes are known by a person skilled in the art to be produced according to a "radical" process, according to a catalysis of "Ziegler-Natta" type or, more recently, according to a "metallocene" catalysis.

Advantageously, the functionalized polyolefins (B1) are chosen from any polymer comprising α-olefin units and units bearing polar reactive functional groups, such as carboxylic acid or carboxylic acid anhydride functional groups. Mention may be made, as examples of such polymers, of polymers of ethylene and alkyl acrylate, such as the Lucalen® products, terpolymers of ethylene, alkyl acrylate and maleic anhydride, such as the Lotader® products from the applicant company, or polyolefins grafted by maleic anhydride, such as the Orevac® products from the applicant company, or terpolymers of ethylene, octene and maleic anhydride known as Fusabond® 493 from Dupont, and also terpolymers of ethylene, alkyl acrylate and (meth)acrylic acid.

The Additives

The thermoplastic polymer, in particular the polyamide, can contain at least one usual additive, such as heat stabilizers, glass fibers, carbon fibers, a flame retardant, talc, a nucleating agent, a plasticizer, a colorant, a fluorinated agent, a lubricant, a stearate, such as zinc stearate, calcium stearate or magnesium stearate, and also another polyamide, catalyzed or noncatalyzed, different from that used above.

It should be noted that said heat stabilizer is different from the copper-based heat stabilizer described above and consequently does not contain copper.

The heat stabilizer can be an organic stabilizer or more generally a combination of organic stabilizers, such as a primary antioxidant of phenol type (for example of the type of that of Irganox® 245 or 1098 or 1010 from BASF), a secondary antioxidant of phosphite type, and indeed even optionally other stabilizers, such as a HALS, which means Hindered Amine Light Stabilizer (for example Tinuvin® 770 from BASF), a UV inhibitor (for example Tinuvin® 312 from BASF), a phenol stabilizer or a phosphorus-based stabilizer. Use may also be made of antioxidants of amine type, such as Naugard® 445 (4,4'-bis(α,α-dimethylbenzyl) diphenylamine) from Crompton or Flexamine® from Addivant, or else of polyfunctional stabilizers, such as Nylostab® S-EED from Clariant.

Advantageously, the present invention relates to one of the uses defined above in which at least one polyolefin and/or at least one additive are optionally present, in particular up to 30% each by weight, with respect to the total weight of the composition.

Advantageously, the present invention relates to one of the uses defined above in which a polyolefin is also present, in particular from approximately 1 to approximately 15% by weight, with respect to the total weight of the composition. Advantageously, the polyolefin is chosen from a maleated EPR, in particular Exxelor® VA 1801 and Exxelor® VA1803, sold by ExxonMobil, a Fusabond®, in particular Fusabond® 493 from DuPont, and Tafmer® MH5020, Tafmer® 610MP and Tafmer® MD715 from Mitsui Chemicals.

Advantageously, the present invention relates to one of the uses defined above in which at least one additive is optionally present, in particular up to 30%.

Advantageously, the present invention relates to one of the uses defined above in which an additive is also present, in particular from approximately 0.1 to approximately 1% by weight, with respect to the total weight of the composition.

Advantageously, the additive is a heat stabilizer.

Advantageously, the present invention relates to one of the uses defined above in which a polyolefin is present, especially from approximately 1 to approximately 15% by weight, with respect to the total weight of the composition, and at least one additive is also present, especially from approximately 0.1 to approximately 30%, especially from approximately 0.1 to approximately 20% and in particular from approximately 0.1 to approximately 10% by weight, with respect to the total weight of the composition.

Advantageously, the present invention relates to one of the uses defined above in which a polyolefin is present, in particular from approximately 1 to approximately 15% by weight, with respect to the total weight of the composition, and an additive is also present, especially from approximately 0.1 to approximately 1% by weight, with respect to the total weight of the composition.

Advantageously, the polyolefin is chosen from a maleated EPR, in particular EPR 1801, and a Fusabond®, especially Fusabond® 493, and the additive is a heat stabilizer.

The Plasticizers

As regards the plasticizer, it is chosen from benzenesulfonamide derivatives, such as n-butylbenzenesulfonamide (BBSA) or N-(2-hydroxypropyl)benzenesulfonamide (HP-BSA) from Proviron, ethyltoluenesulfonamide or N-cyclohexyltoluenesulfonamide from Sigma-Aldrich; esters of hydroxybenzoic acids, such as 2-ethylhexyl para-hydroxybenzoate (EHPD) from Ueno Fine Chemicals and 2-decylhexyl para-hydroxybenzoate (HD-PB) from Kao; esters or ethers of tetrahydrofurfuryl alcohol, such as oligoethyleneoxytetrahydrofurfuryl alcohol; and esters of citric acid or of hydroxymalonic acid, such as oligoethyleneoxy malonate. n-Butylbenzenesulfonamide (BBSA) is a particularly preferred plasticizer. It would not be departing from the scope of the invention to use a mixture of plasticizers. The plasticizer can be introduced into the polyamide during the polycondensation or subsequently. The proportion of plasticizer can be from 0 to 15% by weight.

Advantageously, the plasticizer used is a benzenesulfonamide derivative, such as n-butylbenzenesulfonamide (BBSA).

Advantageously, the present invention relates to one of the uses defined above in which a plasticizer is also present, in particular from approximately 1 to approximately 10% by weight, with respect to the total weight of the composition.

Advantageously, the present invention relates to one of the uses defined above in which a polyolefin is present, especially from approximately 1 to approximately 15% by weight, with respect to the total weight of the composition, at least one additive is also present, especially from approximately 1 to approximately 10% by weight, with respect to the total weight of the composition, and also a plasticizer, especially from approximately 1 to approximately 10% by weight, with respect to the total weight of the composition.

Advantageously, the present invention relates to one of the uses defined above in which a polyolefin is present, especially from approximately 1 to approximately 15% by weight, with respect to the total weight of the composition, an additive is also present, especially from approximately 0.1 to approximately 1% by weight, with respect to the total weight of the composition, and also a plasticizer, especially from approximately 1 to approximately 10% by weight, with respect to the total weight of the composition.

Advantageously, the polyolefin is chosen from a maleated EPR, in particular EPR® 1801, and a Fusabond®, especially Fusabond® 493, and the additive is a heat stabilizer, and the plasticizer is a benzenesulfonamide derivative, such as n-butylbenzenesulfonamide (BBSA).

Compositions

According to another aspect, the present invention relates to a viscous composition which is stable in transformation as defined above, characterized in that it comprises, with respect to the total weight of the composition:

a. 20.5 to 99.845% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 0 to 15% of at least one plasticizer;
f. 0 to 30% of at least one polyolefin;
g. 0 to 30% of at least one additive.

According to this aspect, putting aside the proportion of polyamide present in the composition, which is limited from 20.5 to 99.845% by weight, with respect to the total weight of the composition, the catalyst, the copper-based heat stabilizer, the oligo- or polycarbodiimide, the plasticizer, the polyolefin and the additive are as defined above for the use, and the different combinations and alternative forms relating to the proportions of these different constituents thus apply to these compositions as such.

Said composition exhibits all the properties defined above, namely exhibiting a good melt viscosity which is stable in transformation, especially in extrusion, between 1 minute and at least 30 minutes, especially between 1 minute and 30 minutes, and especially said melt viscosity of said composition is substantially constant between 1 minute and at least 5 minutes, especially between 1 minute and 5 minutes. Said composition additionally exhibits a resistance to thermal oxidation. It exhibits in particular a melt viscosity of approximately 13 000 to approximately 23 000 Pa·s, as determined by oscillatory rheology at 270° C. (plate-plate), especially for at least 30 minutes, in particular for 30 minutes.

Advantageously, said composition exhibits a resistance to hydrolysis.

The expression "resistance to hydrolysis" means that the half life of the pipes (in hours), which corresponds to the time at the end of which the pipes tested break, after exposure to hot water or a mixture of water and ethylene glycol at 140° C., with an elongation at break test according to the standard ISO 527-2 (2012), is at least 40 days. In other words, it is the time in order to have 50% absolute of elongation at break of the pipes.

Advantageously, said composition exhibits a resistance to thermal oxidation and a resistance to hydrolysis.

Thus, the composition of the invention, whether or not it comprises polyolefins and/or plasticizers and/or additives, exhibits a melt viscosity of approximately 13 000 to approximately 23 000 Pa·s for at least 30 minutes, this being the case whatever the inherent viscosity of the composition devoid of said polyolefins, plasticizers and additives.

The compositions of the invention make it possible to facilitate the extrusion of large pipes, in particular for gas pipes or the exploitation of offshore oil.

Furthermore, the compositions of the invention are particularly stable to thermal behavior and to hydrolysis.

Advantageously, the polyamide is chosen from PA11, PA12, PA 11/10.T, PA 10.10, PA 10.12 and copolyamides 11/12 having either more than 90% of units 11 or more than 90% of units 12, especially from PA11, PA12, PA 11/10.T, PA 10.10 and PA 10.12, the catalyst is chosen from phosphoric acid ($H_3PO_4$), phosphorous acid ($H_3PO_3$), hypophosphorous acid ($H_3PO_2$), or a mixture of these, the copper-based heat stabilizer is a mixture of potassium iodide and copper iodide, the oligo- or polycarbodiimide is chosen from a Stabilizer, especially Stabilizer® 9000, a Stabaxol®, in particular a Stabaxol® P, especially Stabaxol® P100 or Stabaxol® P400, or a mixture of these.

Advantageously, the composition comprises:
a. 95.5 to 99.845% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide.

More advantageously, said composition comprises or consists of:
a. 85.5 to 98.845% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 1 to 10% by weight of at least one additive.

Advantageously, the additives of said composition a., b., c., d. and e. which is defined above are a mixture of a colorant in the form of a masterbatch, of a UV stabilizer, of a nucleating agent and of heat stabilizers.

This composition can be in the granule or powder form and is suitable for numerous applications.

Advantageously, the composition comprises or consists of:
a. 80.5 to 98.845% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 1 to 15% of at least one plasticizer.

More advantageously, said composition comprises or consists of:
a. 70.5 to 97.845% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 1 to 15% of at least one plasticizer.
f. 1 to 10% by weight of at least one additive.

Advantageously, the additives of said composition a., b., c., d., e. and f. which is defined above are a mixture of a colorant in the form of a masterbatch, of a UV stabilizer, of a nucleating agent and of heat stabilizers.

This composition can be in the granule or powder form and is more particularly suitable for the molding of parts, in particular for sport.

Advantageously, the composition consists of:
a. 55.5 to 98.745% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 1 to 30% of at least one polyolefin;
f. 0.1 to 10% of at least one additive.

Advantageously, the additives of said composition a., b., c., d., e. and f. which is defined above are a mixture of a colorant in the form of a masterbatch, of a UV stabilizer, of a nucleating agent and of heat stabilizers.

Advantageously, the composition consists of:
a. 64.5 to 98.745% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 1 to 30% of at least one polyolefin;
f. 0.1 to 1% of at least one additive.

These last two compositions can be in the granule or powder form and are more particularly suitable for the extrusion of gas pipes.

Advantageously, the composition consists of:
a. 40.50 to 97.745% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 1 to 15% of at least plasticizer;
f. 1 to 30% of at least one polyolefin;
g. 0.1 to 10% of at least one additive.

Advantageously, the additives of said composition a., b., c., d., e., f. and g. which is defined above are a mixture of a colorant in the form of a masterbatch, of a UV stabilizer, of a nucleating agent and of heat stabilizers.

Advantageously, the composition consists of:
a. 49.50 to 97.745% by weight of at least one polyamide as defined above;
b. 0.005 to 0.5% by weight of at least one catalyst;
c. 0.05 to 1% by weight of at least one copper-based heat stabilizer;
d. 0.1 to 3% by weight of at least one oligo- or polycarbodiimide;
e. 1 to 15% of at least plasticizer;
f. 1 to 30% of at least one polyolefin;
g. 0.1 to 1% of at least one additive.

These last two compositions can be in the granule or powder form and are more particularly suitable for the extrusion of pipes for the exploitation of offshore oil deposits or of pipes for use under a motor vehicle hood or for the molding of parts, in particular for sport.

Advantageously, the polyamide of the compositions of the invention is chosen from an aliphatic polyamide, a cycloaliphatic polyamide, an aromatic polyamide or a mixture of these.

Use of the Composition

According to another aspect, the present invention relates to the use of a composition as defined above for forming a structure, such as:
a flexible pipe intended for the transportation of gas, for the exploitation of offshore oil deposits,
a flexible pipe for motor vehicles, in particular for the transportation of fuel (gasoline, diesel, biodiesel or ethanol), for refrigeration, for air conditioning, for ducts produced in particular by extrusion-blow molding for supplying with air, a hollow body, a molding or a sports item.

According to this aspect, just like above, the catalyst, the copper-based heat stabilizer, the oligo- or polycarbodiimide, the plasticizer, the polyolefin and the additive are as defined above for the use or the composition, and the different combinations and alternative forms relating to the proportions of these different constituents defined above thus apply to the use of these compositions for forming said structure.

The flexible pipe intended for the transportation of gas or for the exploitation of offshore oil deposits exhibits a good resistance to thermal oxidation and a resistance to hydrolysis and in particular a working temperature of at least 70° C. for 20 years.

Advantageously, the compositions used for forming a structure which is a flexible pipe intended for the exploitation of offshore oil deposits can also be used for forming a structure which is a flexible pipe for motor vehicles, in particular for the transportation of fuel (gasoline, diesel, biodiesel or ethanol), for refrigeration, for air conditioning or for ducts produced in particular by extrusion-blow molding for supplying with air.

Structure

According to another aspect, the present invention relates to a flexible pipe intended for the transportation of gas or for the exploitation of offshore oil deposits, or for motor vehicles, in particular for the transportation of fuel (gasoline, diesel, biodiesel or ethanol), for refrigeration, for air conditioning or for supplying with air as defined above, comprising at least one layer of a composition as defined above.

According to this aspect, just like above, the catalyst, the copper-based heat stabilizer, the oligo- or polycarbodiimide, the plasticizer, the polyolefin and the additive are as defined above for the use or the composition, and the different combinations and alternative forms relating to the proportions of these different constituents defined above thus apply to the pipes as such.

Advantageously, the flexible pipe defined above is characterized in that said layer is the layer in contact with the fluid and the composition is as defined above for forming a structure which is a flexible pipe intended for the transportation of gas.

Advantageously, said pipe intended for the transportation of gas is a monolayer pipe.

Advantageously, said flexible pipe intended for the transportation of gas is characterized in that it can additionally comprise at least one other layer, in particular made of thermoplastic.

Said pipe can furthermore comprise a reinforcer, in particular a reinforcer chosen from a metal reinforcer, a reinforcer made of glass fiber, a reinforcer made of carbon fiber and a reinforcer made of aramid fiber. Advantageously, the flexible pipe defined above of the invention is characterized in that said layer is the internal layer of a flexible pipe intended for the exploitation of offshore oil deposits, the composition being as defined above, for forming a structure which is a flexible pipe intended for the exploitation of offshore oil deposits.

The structure of pipes intended for the exploitation of offshore oil deposits is described in particular in the international application WO 2013/128097 and corresponds especially to the pipe comprising the layers 2 to 8 of FIG. 1 of said international application WO 2013/128097.

Said internal layer corresponds in this case to the layer 3 of the pipe of the international application WO 2013/128097, that is to say the pressure sheath or sealing sheath.

Advantageously, the flexible pipe defined above is characterized in that said layer is the external layer of a flexible pipe intended for the exploitation of offshore oil deposits, the composition being as defined above, for forming a structure which is a flexible pipe intended for the exploitation of offshore oil deposits.

Said external layer corresponds in this case to the layer (8) of the pipe of the international application WO 2013/128097.

Advantageously, the flexible pipe of the invention intended for the exploitation of offshore oil deposits comprises an internal layer (3) defined above and an external layer (8) defined above, said internal and external layers consisting of the same composition of the invention or each consisting of a different composition of the invention.

It would not be departing from the scope of the invention if one of the layers (3) or (8) consisted of a thermoplastic other than that of the invention as described in WO 2013/128097, in particular another polyamide.

Advantageously, the flexible pipe of the invention intended for the exploitation of offshore oil deposits consists of the layers 2/3/4/6/7/8 described in WO 2013/128097, the layers 3 and 8 being as defined above, and the layer 2 corresponding to the internal carcass in contact with the oil, the layer 4 corresponding to an intermediate sheath made of polyethylene or polypropylene and the layers 6 and 7 corresponding to tensile armor layers.

Advantageously, the flexible pipe of the invention intended for the exploitation of offshore oil deposits consists of the layers 2/3/4/5/6/7/8 described in WO 2013/128097, the layers 2 to 4 and 6 to 8 being as defined above and the layer (5) corresponding to the pressure vault.

Advantageously, the flexible pipe of the invention intended for the exploitation of offshore oil deposits consists of the layers 30/40/50/80/90 described in the application US 2009/0308478.

Said internal layer defined above consisting of compositions of the invention can correspond to the internal layer 30.

Said external layer defined above consisting of compositions of the invention can correspond to the external layer 90 of said application US 2009/0308478.

The other layers are as defined in the application US 2009/0308478.

Advantageously, the flexible pipe as defined above for motor vehicles, in particular for the transportation of gasoline, for refrigeration, for air conditioning, for ducts produced in particular by extrusion-blow molding for supplying with air, is characterized in that it comprises at least one layer consisting of a composition as defined for forming a structure which is a flexible pipe intended for the exploitation of offshore oil deposits.

The pipe for air conditioning is in particular suitable for the transportation of a refrigerant and in particular of the gas R-1234yf or cis- or trans-1234-ze), used in particular in the field of motor vehicle air conditioning or stationary air conditioning.

The invention will now be illustrated using the following examples, which are not, however, limiting of the invention.

DESCRIPTION OF THE FIGURES

FIG. 1 exhibits the oscillatory rheology at 270° C. (frequency: 10 rad/s, 5% deformation, shearing 10 s$^{-1}$) from 0 to 30 minutes.

The graph exhibits the analysis time in seconds on the abscissa and the viscosity in Pa·s on the ordinate.

At 1800 seconds, from the top downwards:
Catalyzed PA 11 (600 ppm $H_3PO_4$).
Catalyzed PA 11 (600 ppm $H_3PO_4$)+1% Stabilizer 9000.
Catalyzed PA 11 (600 ppm $H_3PO_4$)+1% Stabilizer 9000+ 0.25% iodine 201:
curve of the invention, the only one having a viscosity of between 13 000 and 23 000 Pa·s.
Non-catalyzed PA 12+1% Stabilizer 9000+0.25% iodine 201.
Non-catalyzed PA 11+1% Stabilizer 9000.
Catalyzed PA 11 (600 ppm $H_3PO_4$)+0.25% iodine 201.
Non-catalyzed PA 11.

EXAMPLES

Products Used

The polyamides used are PA 11 (Besno, sold by Arkema), PA 12 (Aesno, sold by Arkema), PA 10.10 (sold by Arkema: Hiprolon 200) and PA 10.12 (sold by Arkema: Hiprolon 400).

The copper-based heat stabilizer is PolyAdd P201 from Polyad Services (iodine 201).

The carbodiimide used is Stabilizer® 9000 (poly(1,3,5-triisopropylphenylene-2,4-carbodiimide), sold by Raschig, or TCC, sold by Teijin.

The catalyst used is $H_3PO_3$ or $H_3PO_4$.

Anox® NDB TL89: organic stabilizer of phenol phosphite type, sold by Chemtura.

BBSA: n-butylbenzenesulfonamide, sold by Proviron.

EPR 1801: polyolefin (maleic anhydride-functionalized ethylene copolymer), sold by Exxon.

Fusabond® 493: polyolefin (anhydride-functionalized ethylene copolymer), sold by DuPont.

Example 1

Determination of the Melt Viscosity of Polyamides of the Invention with or without Catalyst in the Presence or not of a Copper-Based Stabilizer and/or of a Carbodiimide The tests (mixture of PA with or without catalyst, to which a copper-based stabilizer and/or a carbodiimide are or are not added) are carried out on an Xplore MC15 micro compounder equipped with 111 and 123 screws (screw profile 2).

The flat temperature profile at 270° C. is programmed.

The various mixtures are produced with a screw speed of 100 rpm and a recirculation time of 25 minutes, to which the machine feed time, i.e. between 1'30 and 2', has to be added.

The tests are carried out while flushing with nitrogen (0.5 bar).

The normal force is measured in N. It represents the change in the melt viscosity.

The viscosity at T0 and its change at T+30 minutes are determined by plate-plate oscillatory rheology.

Plate-plate: 30 min at 270° C. 10 rad/sec 5% deformation according to the following operating conditions:
Appliance: Physica MCR301
Geometry: parallel plates with a diameter of 25 mm
Temperatures: 270° C.
Frequency: 10 rad.$s^{-1}$
Duration: 30 minutes
Atmosphere: Flushing with nitrogen.
Shearing of 10 $s^{-1}$

Example 1.1

PA 11, PA 12 and PA 10.10 without Catalyst: with or without Copper-Based Heat Stabilizer and/or Carbodiimide The percentages are shown by weight.

The melt viscosity is determined at T0 and after 30 minutes.

The inherent viscosity is determined in m-cresol according to the standard ISO 307-2007.

The method is well known to a person skilled in the art. The standard ISO 307-2007 is followed but with the solvent being changed (use of m-cresol instead of sulfuric acid) and the temperature being 20° C.

|  | PA 11 | PA 11 | PA 11 |
|---|---|---|---|
| Inherent viscosity | 1.45 | 1.45 | 1.45 |
| Catalyst | — | — | — |
| Copper-based heat stabilizer | — | 0.25% iodine 201 | 0.25% iodine 201 |
| Carbodiimide | — | — | 1% Stabilizer 9000 |
| Plate-plate 270° C. 10 rad/sec (melt viscosity) | Pa · s | Pa · s | Pa · s |
| T0 | 384 | No RIV | 5350 |
| After 30 min | 807 | No RIV | 5278 |
| Comment | Too fluid | Too fluid | Too fluid |

"No RIV" means that there is no rise in viscosity.

A PA 11, without catalyst, with a relatively high inherent viscosity (1.45, extrusion grade), is not viscous enough, whether with copper-based stabilizer alone or copper-based stabilizer and carbodiimide.

The addition of 0.25% of iodine 201 does not increase the viscosity.

The addition of carbodiimide provides a rise in melt viscosity which, however, is not sufficient for the transformation of the product.

|  | PA 12 | PA 12 |
|---|---|---|
| Inherent viscosity | 1.60 | 1.60 |
| Catalyst | — | — |
| Copper-based heat stabilizer | — | 0.25% iodine 201 |
| Carbodiimide | — | 1% Stabilizer 9000 |
| Plate-plate 270° C. 10 rad/sec (melt viscosity) | Pa · s | Pa · s |
| T0 | 7152 | 9000 |
| After 30 min | 7800 | 10000 |
| Comment | Too fluid | Too fluid |

A PA 12 (Aesno from Arkema without chain-limiting agent), without catalyst, with a high inherent viscosity (1.6), is not viscous enough even with addition of copper-based stabilizer and carbodiimide.

The addition of carbodiimide provides a rise in melt viscosity which, however, is not sufficient for the transformation of the product.

|  | PA 10.10 | PA 10.10 | PA 10.10 |
|---|---|---|---|
| Inherent viscosity | 1.35 | 1.35 | 1.35 |
| Catalyst | — | — | — |
| Copper-based heat stabilizer | — | 0.25% iodine 201 | 0.25% iodine 201 |
| Carbodiimide | — | — | 1% Stabilizer 9000 |
| Plate-plate 270° C. 10 rad/sec (melt viscosity) | Pa·s | Pa·s | Pa·s |
| T0 | 1650 | No RIV | 7685 |
| After 30 min | 2648 | No RIV | 9635 |
| Comment | Too fluid | Too fluid | Too fluid |

A PA 10.10, with a medium inherent viscosity (1.35), is too fluid, whether with copper-based stabilizer to which carbodiimide has or has not been added.

Consequently, the problem of the melt inherent viscosity cannot be solved by increasing the starting inherent viscosity.

Example 1.2

PA 11, PA 10.10 and PA 10.12 with Catalyst: with or without Copper-Based Heat Stabilizer and/or Carbodiimide The percentages are shown by weight.

|  | PA 11 | Catalyzed PA 11 | Catalyzed PA 11 |
|---|---|---|---|
| Inherent viscosity | 1.45 | 1.45 | 1.45 |
| Catalyst | 600 ppm $H_3PO_4$ | 600 ppm $H_3PO_4$ | 600 ppm $H_3PO_4$ |
| Copper-based heat stabilizer | — | 0.25% iodine 201 | 0.25% iodine 201 |
| Carbodiimide | — | — | 1% Stabilizer 9000 |
| Plate-plate 270° C. 10 rad/sec (melt viscosity) | Pa·s | Pa·s | Pa·s |
| T0 | 13500 | 1550 | 19000 |
| After 30 min | 30000 | 7300 | 23000 |
| Comments | Too much change | Too fluid | Invention |
| Change after 400 sec | 21 000, i.e. + 55% |  | 5% |
| Change after 30 min | 148% |  | 22% |

A PA 11 with a relatively high inherent viscosity (1.45; extrusion grade) is sufficiently viscous in the molten state at T0 (i.e., a melt viscosity of greater than or equal to approximately 13 000 Pa·s) but changes too much since the melt viscosity is very markedly greater than 23 000 Pa·s).

The addition of a heat stabilizer to the catalyzed PA 11 does not make it possible to improve the viscosity, quite the opposite since the latter falls drastically, stopping even the rotation.

On the other hand, the addition of a heat stabilizer and carbodiimide makes it possible not only to obtain a melt viscosity of greater than or equal to approximately 13 000 Pa·s but a melt viscosity which is also stable for at least 30 minutes.

|  | PA 10.10 | PA 10.10 | PA 10.10 |
|---|---|---|---|
| Inherent viscosity | 1.45 | 1.45 | 1.45 |
| Catalyst | 2000 ppm $H_3PO_4$ | 2000 ppm $H_3PO_4$ | 2000 ppm $H_3PO_4$ |
| Copper-based heat stabilizer | — | 0.2% iodine 201 | 0.2% iodine 201 |
| Carbodiimide | — | — | 1% Stabilizer 9000 |
| Plate-plate 270° C. 10 rad/sec (melt viscosity) | Pa·s | Pa·s | Pa·s |
| T0 | 9369 | 10200 | 13357 |
| After 30 min | 12805 | 16400 | 20313 |
| Comment | Too fluid | Too fluid | Invention |
| Change after 30 min |  |  | 52% |

A PA 10.10 with an inherent viscosity of 1.45 comprising only a catalyst is not sufficiently viscous in the molten state at T0 (i.e., a melt viscosity of less than 13 000 Pa·s).

The addition of a heat stabilizer does not make it possible to achieve a sufficient melt viscosity.

On the other hand, the addition of a heat stabilizer and carbodiimide makes it possible not only to obtain a melt viscosity of greater than or equal to approximately 13 000 Pa·s but a melt viscosity which is also stable for at least 30 minutes.

|  | PA 10.12 | PA 10.12 | PA 10.12 |
|---|---|---|---|
| Inherent viscosity | 1.4 | 1.4 | 1.4 |
| Catalyst | 100 ppm $H_3PO_3$ | 100 ppm $H_3PO_3$ | 100 ppm $H_3PO_3$ |
| Copper-based heat stabilizer | — | 0.2% iodine 201 | 0.2% iodine 201 |
| Carbodiimide | — | — | 1% Stabilizer 9000 |
| Plate-plate 270° C. 10 rad/sec (melt viscosity) | Pa·s | Pa·s | Pa·s |
| T0 | 6156 | 9000 | 17653 |
| After 30 min | 27558 | 17000 | 19772 |
| Comment | Too fluid and too much change | Too fluid and too much change | Invention |
| Change after 30 min | 347% | 89% | 12% |

In the same way, with a PA 10.12 with an inherent viscosity of 1.4 comprising only a catalyst, the melt viscosity at T0 is too low (less than 13 000 Pa·s).

The addition of a heat stabilizer does not make it possible to achieve a sufficient melt viscosity.

On the other hand, the addition of a heat stabilizer and carbodiimide makes it possible not only to obtain a melt viscosity of greater than or equal to approximately 13 000 Pa·s but a melt viscosity which is also stable for at least 30 minutes.

Example 2

Influence of the Presence of Catalyst and of the Proportion of a Copper-Based Stabilizer and/or Carbodiimide on the Rheological Properties of the Polyamides of the Invention

Example 2.1

The percentages are shown by weight.
The polyamide used for all the tests of this example is PA 11 with an inherent viscosity of 1.45 as above.

| Catalyst (ppm) | Copper-based heat stabilizer (Iodine 201) % by weight | Carbodiimide % by weight | Rheology | Viscosity stability |
|---|---|---|---|---|
| 0 | 0 | 0 | − | ++ |
| 0 | 0 | 1 | − | ++ |
| 0 | 0 | 1.5 | + | + |
| 0 | 0 | 2 | + | + |
| 600 | 0 | 0 | + | − |
| 600 | 0 | 1 | − | − |
| 600 | 0.25 | 0 | − | + |
| 600 | 0.25 | 1 | ++ | ++ |

The remainder to 100% is, in each case, the percentage by weight of PA 11.
"−" means that the value obtained is insufficient for the transformation
"+" means that the value is borderline for the transformation
"++" means that the value obtained is comfortable for the transformation This example shows that the most important aspect for the transformation is not the inherent viscosity value but the value of the melt viscosity with the catalyst/copper-based heat stabilizer/carbodiimide combination.

Example 2.2

The Polyamide used for all the Tests of this Example is PA 11.

The percentages shown are by weight.

|  | Inherent viscosity | Plate-plate at T0 |
|---|---|---|
| PA 11 + 600 ppm $H_3PO_4$ | 1.77 | 15000 |
| Noncatalyzed PA 11 + 1% Stabilizer ® 9000 | 1.80 | 6600 |
| Noncatalyzed PA 11 + 1.5% Stabilizer ® 9000 | 2.25 | 12130 |
| PA 11 + 600 ppm $H_3PO_4$ + 1% Stabilizer ® 9000 + 0.25% iodine 201 | 2.30 | 20000 |

There is no correlation between the viscosity in solution (inherent viscosity in meta-cresol) and the melt viscosity. This can be explained by the polydispersity index representative of the branchings.

Example 3

Evaluation of the Compositions of the Invention Additionally Comprising Polyolefins and/or Plasticizers and/or Additives: Thermal Behavior at 140° C.

The proportions shown are percentages by weight, with respect to the total weight of the composition.
Test on twin-screw at 280° C. -300 rev/min under vacuum-600 mmHg (Werner 40) at 60 kg/h.
The PA base is dried (moisture content<0.1%).

|  | Comp. 1 | Comp. 2 | Comp. 3 | Comp. 4 | Inv. 1 | Inv. 2 |
|---|---|---|---|---|---|---|
| Anox NDB TL89 | 1.2 |  |  |  |  |  |
| BBSA | 6 | 6 | 10 | 6 | 6 | 6 |
| PA 11 + 600 ppm $H_3PO_4$ Inherent viscosity 1.45 | 82.8 |  |  | 83.8 | 82.8 | 83.3 |
| EPR 1801 | 10 |  |  | 10 | 10 | 10 |
| Fusabond 493 |  | 10 | 6 |  |  |  |
| iodine 201 |  | 0.2 | 0.2 | 0.2 | 0.2 | 0.2 |
| PA 11 inherent viscosity 1.45 |  | 82.5 | 82.5 |  |  |  |
| Stabilizer 9000 | 0 | 1.3 | 1.3 | 0 | 1 |  |
| TCC |  |  |  |  |  | 0.5 |
| Head pressure (bar) | 23 | 35 | 33 | 16.5 | 40 | 40 |
| Torque (%) | 71 | 68 | 63 | 63 | 86 | 82 |
| RCG at 260° C. 5 min at 100 sec$^{-1}$: in Pa · s | 2819 | 2209 | 1936 |  | 3830 |  |
| plate-plate at 10 rad/sec: T0 at 270° C. in Pa · s | 13000 | 10300 | 9800 | 1200 | 14000 | 13000 |
| plate-plate at 10 rad/sec: after 30 min at 270° C. in Pa · s | 31800 | 5140 | 2770 | 8000 | 21000 | 19000 |
| Test specimens ISO 527-2 1BA Half life at 140° C. | 720 h |  |  | >2000 h | >2000 h | >2000 h |
| Corrected inherent viscosity | 1.72 | 2.22 | 2.49 | 1.50 | 2.31 | 2.2 |

The half life measured with regard to the elongation at break changes from 30 days for the comparative composition 1 (PA 11+600 ppm of catalyst), which does not comprise heat stabilizer and carbodiimide, to 90 days for a composition of the invention simultaneously comprising a catalyst (same proportion as the comparative composition 1), a copper-based stabilizer and a carbodiimide.

The composition according to the invention is more viscous than the comparative composition 4, the only difference being the presence of carbodiimide in the formulation according to the invention (at T0 and T=30 min).

Furthermore, the comparative composition 1 exhibits a melt viscosity which a priori seems good (T0=13 000) but which changes much too much up to T=30 min, thus not making it difficult to transform it, in contrast to the composition according to the invention.

Moreover, the comparative compositions 2 and 3, which do not comprise catalyst but comprise a carbodiimide in a greater proportion than that of the composition of the invention (1.3% instead of 1%), not only have melt viscosities at T=0 which do not reach the required value of 13 000 Pa·s but also are completely devoid of stability since the viscosity at T=30 min strongly decreases.

Example 4

Resistance to Hydrolysis of a Formulation of the Invention (example 3) Compared with that of a Besno P40 TL

|  | Besno P40 TL | Example 3 of the invention |
|---|---|---|
| Thermal stability at 140° C. Half life | 700 h | 2000 h |
| Resistance to hydrolysis 140° C. Volvic water pH 4 Time in order to have 50% absolute of elongation at break | 280 h | 950 h |
| Plate-plate viscosity at 270° C. 10 rad/sec, 5% deformation | | |
| T0 | 9000 | 14000 |
| T = 30 min | 32000 | 21000 |

The Besno P40 TL product is an Arkema Offshore reference PA11+ $H_3PO_4$ +plasticizer+heat stabilizer.

This table shows that the compounds of the invention exhibit a stability to hydrolysis and a melt viscosity which is improved, whatever the time (T=0 or T=30 min).

Example 5

Comparison of the Properties of the Compositions According to the Invention with the Comparative Compositions

| PA | Cat. (ppm) | Carb. % by weight | Stab. % by weight | High viscosity | Stable viscosity | Hyd. | Ox. |
|---|---|---|---|---|---|---|---|
| PA 11 | 0 | 0 | 0 | − | ++ | − | − |
| PA 11 | 0 | 1 | 0 | + | ++ | + | − |
| PA 11 | 0 | 0 | 0.2 | − | ++ | + | ++ |
| PA 11 | 0 | 1 | 0.2 | + | ++ | ++ | ++ |
| PA 11 | 600 | 0 | 0 | ++ | − | − | − |
| PA 11 | 600 | 0 | 0.2 | − | ++ | + | ++ |
| PA 11 | 600 | 1 | 0 | − | − | + | − |
| PA 11 | 600 | 1 | 0.2 | ++ | ++ | ++ | ++ |

PA 11: Inherent viscosity 1.45.
Cat.: $H_3PO_4$ catalyst.
Carb.: polycarbodiimide Stabilizer 9000.
Stab.: Copper-based heat stabilizer (Iodine 201).
Hyd.: Resistance to hydrolysis.
Ox.: Resistance to oxidation.
− means that the value obtained is insufficient for the desired property with regard to the service performances.
+ means that the value obtained is borderline for the desired property with regard to the service performances.
++ means that the value obtained is comfortable for the desired property with regard to the service performances.

Only the composition simultaneously comprising a catalyst, a polycarbodiimide and a heat stabilizer makes it possible to obtain a good value for the six properties desired with regard to the service performances.

The invention claimed is:

1. A method for forming a composition which exhibits a good melt viscosity and which is stable during transformation comprising the step of combining:
   about 50 ppm to about 5000 ppm of at least one catalyst,
   about 0.05% to about 1% of at least one copper-based heat stabilizer,
   and about 0.1% to about 3% of at least one oligo- or polycarbodiimide with a matrix comprising at least one polyamide;
   wherein said melt viscosity is from about 13,000 to about 23,000 Pas, as determined by oscillatory rheology at 270° C. at 10 rad/sec while flushing with nitrogen with 5% deformation and shearing of 10 sec-1 between two parallel plates with a diameter of 25 mm, and
   wherein said stable in transformation means that the melt viscosity does not change by more than 70% as a function of time between 1 minute and 30 minutes during a melt process,
   wherein the catalyst is chosen from phosphoric acid ($H_3PO_4$), phosphorous acid ($H_3PO_3$), hypophosphorous acid ($H_3PO_2$) or a mixture of these,
   wherein the copper-based heat stabilizer comprises copper iodide,
   wherein the polyamide is chosen from: PA 11, PA 12, 11/10.T, PA 10.10, PA 10.12.

2. The method as claimed in claim 1, wherein said melt viscosity of said composition is substantially constant between 1 minute and at least 5 minutes.

3. The method as claimed in claim 1, wherein said composition additionally exhibits a resistance to thermal oxidation.

4. The method as claimed in claim 1, wherein the proportion by weight of catalyst is comprised of about 100 ppm to about 3000 ppm, with respect to the total weight of the composition.

5. The method as claimed in claim 1, wherein the proportion by weight of copper-based heat stabilizer is comprised of about 0.05% to about 0.3%, with respect to the total weight of the composition.

6. The method as claimed in claim 5, copper-based heat stabilizer further comprises potassium iodide.

7. The method as claimed in claim 1, wherein the proportion by weight of oligo- or polycarbodiimide is comprised of about 0.5 to about 2% with respect to the total weight of the composition.

8. The method as claimed in claim 1, wherein the polyamide exhibits a M.p. comprised of 160° C. to 290° C., determined according to the standard ISO 11357-3 (2013).

* * * * *